United States Patent
Wang

(10) Patent No.: US 10,503,242 B2
(45) Date of Patent: Dec. 10, 2019

(54) POWER SUPPLY METHOD, APPARATUS, AND SYSTEM

(71) Applicant: ZTE CORPORATION, Shenzhen (CN)

(72) Inventor: Xiaojun Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 259 days.

(21) Appl. No.: 15/322,903

(22) PCT Filed: Oct. 20, 2014

(86) PCT No.: PCT/CN2014/088974
§ 371 (c)(1),
(2) Date: Apr. 20, 2017

(87) PCT Pub. No.: WO2016/000356
PCT Pub. Date: Jan. 7, 2016

(65) Prior Publication Data
US 2017/0220098 A1    Aug. 3, 2017

(30) Foreign Application Priority Data
Jun. 30, 2014 (CN) .......................... 2014 1 0308038

(51) Int. Cl.
*G06F 1/32* (2019.01)
*G06F 1/26* (2006.01)
*H04L 12/10* (2006.01)
*G06F 1/3287* (2019.01)
*G06F 1/3296* (2019.01)

(52) U.S. Cl.
CPC ............ *G06F 1/3287* (2013.01); *G06F 1/266* (2013.01); *G06F 1/3296* (2013.01); *H04L 12/10* (2013.01)

(58) Field of Classification Search
CPC ..................................... G06F 1/32; G06F 1/26
See application file for complete search history.

(56) References Cited

U.S. PATENT DOCUMENTS 5,276,920 A * 1/1994 Kuisma ............... H04B 1/18
455/101
6,178,447 B1    1/2001 Wannenmacher et al.
(Continued)

FOREIGN PATENT DOCUMENTS

| CN | 1988502 A | 6/2007 |
|---|---|---|
| CN | 102651664 A | 8/2012 |
| EP | 1801984 A1 | 6/2007 |

OTHER PUBLICATIONS

PCT International Search Report dated Dec. 30, 2014, Application No. PCT/CN2014/088974, 4 Pages.
(Continued)

*Primary Examiner* — Phil K Nguyen

(57) ABSTRACT

Disclosed are a power supply method, device and system. The method includes that: a working state of a terminal in a home network is detected, herein, the terminal accesses the home network through a coaxial cable; and power supply to optical access equipment is controlled according to the working state, herein, the optical access equipment is arranged to implement access of a passive optical fiber network to the home network.

9 Claims, 5 Drawing Sheets

(56) References Cited

U.S. PATENT DOCUMENTS

| | | | |
|---|---|---|---|
| 6,504,636 B1* | 1/2003 | Seto | H04B 10/504 |
| | | | 398/163 |
| 8,073,329 B2 | 12/2011 | Gao et al. | |
| 8,601,289 B1 | 12/2013 | Smith et al. | |
| 2005/0105913 A1 | 5/2005 | Ozeki et al. | |
| 2005/0258899 A1* | 11/2005 | Lin | H03F 1/56 |
| | | | 330/195 |
| 2009/0077396 A1* | 3/2009 | Tsai, Jr. | G06F 1/3209 |
| | | | 713/310 |
| 2010/0150556 A1 | 6/2010 | Soto et al. | |
| 2010/0164284 A1* | 7/2010 | Lee | G06F 1/266 |
| | | | 307/38 |
| 2011/0318012 A1* | 12/2011 | Lonn | H04B 10/25751 |
| | | | 398/115 |
| 2012/0148246 A1* | 6/2012 | Mukai | H04L 12/40013 |
| | | | 398/58 |
| 2012/0227053 A1* | 9/2012 | Gargash | G06F 9/548 |
| | | | 718/104 |
| 2014/0330989 A1* | 11/2014 | Brewer | H02J 3/00 |
| | | | 710/14 |

OTHER PUBLICATIONS

PCT Written Opinion of the International Searching Authority dated Dec. 30, 2014, Application No. PCT/CN2014/088974, Applicant ZTE Corporation, 5 Pages.

Extended European Search Report dated Apr. 28, 2017, Application No. 14896668.2-1862 / 3163794, Applicant ZTE Corporation, 7 Pages.

* cited by examiner

POWER SUPPLY METHOD, APPARATUS, AND SYSTEM

CROSS-REFERENCE TO RELATED APPLICATIONS

This application is a U.S. national phase of PCT Application No. PCT/CN2014/088974 filed on Oct. 20, 2014, which claims priority to Chinese Patent Application No. 201410308038.5 filed on Jun. 30, 2014, the disclosures of which are incorporated in their entirety by reference herein.

TECHNICAL FIELD

The present disclosure relates to the field of mobile communication, and more particularly to a power supply method, device and system.

BACKGROUND

Along with development of replacing copper cables with optical cables in a hybrid fiber coaxial network, a position of an optical node is continuously moved downwards, the optical node has been moved downwards from a special outdoor cabinet to the door (low-voltage silo) of a user in a rapidly developed region, head-end equipment at the original position of the optical node is correspondingly continuously miniaturized, and along with gradual downward movement of the position, a final service object is decreased from a user group to a family, or 2-4 families Particularly, when it is difficult to implement mounting of an optical fiber to the home for Fiber To The Home (FTTH), miniature head-end equipment is required to perform access medium and protocol conversion between a in-home coaxial cable and the optical fiber. At this moment, the miniature hybrid fiber coaxial network head-end equipment and the optical node are integrated into the same equipment to form equipment which is positioned between a passive optical fiber network and a home network of the user.

Since miniature head-end equipment is extremely close to a user along with an optical fiber, a mounting position may be at the door of the user, may be in a corridor, and may also be in an underground garage, its specific positions and application scenarios are rich and variable, and it is relatively more difficult to get electricity. While a passive optical fiber network side may not provide any power supply interface, and a coaxial cable of a user side is also passive, so that the miniature head-end equipment may not obtain a convenient power supply interface due to its position limit, and a special manner is required to meet such a power supply requirement. Since a home network is connected to a downstream of the miniature head-end equipment, there is commercial power for getting, and a special method and device may be used to get electricity from the home to reversely supply power to the miniature head-end equipment.

An architecture of an existing hybrid fiber coaxial network is shown in FIG. 1, herein all head-end equipment is power by a local 220V or is forward powered by upstream equipment (such as an optical unit or an amplifier) through a 60 Volt Alternating Current (VAC), and in addition, the head-end equipment has relatively higher capacity and is at a relatively higher position in the network, its power is substantially supplied by a 220 VAC of the optical device itself in the hybrid fiber coaxial network or an active amplifier on a line, and the 60 VAC forwards supplies power to the miniature head-end equipment in a co-cable power supply manner.

Existing patents about reverse power supply mainly focus on implementation through a Ethernet category-5 cable, following a related Powering over Ethernet (POE) Institute of Electrical and Electronic Engineers (IEEE) standard, and is also implemented by reverse power supply with a telephone twisted pair and the like, and there are no formal specification.

For the problem that hybrid fiber coaxial head-end equipment (i.e. optical access equipment) connected with a terminal in a home network can not get electricity due to a position limit in a conventional technology, there is yet no effective technical solution.

SUMMARY

For the problem that hybrid fiber coaxial head-end equipment (i.e. optical access equipment) connected with a terminal in a home network can not get electricity due to a position limit in the existing technology, embodiments of the present disclosure provide a power supply method, device and system, so as to at least solve the abovementioned problem.

According to an embodiment of the present disclosure, a power supply method is provided, which includes that: a working state of a terminal in a home network is detected, herein, the terminal accesses the home network through a coaxial cable; and power supply to optical access equipment is controlled according to the working state, herein, the optical access equipment is arranged to implement access of a passive optical fiber network to the home network.

In an exemplary embodiment, the working state includes at least one of the following: power-on of the terminal, registration of the terminal, dormancy of the terminal and power-off of the terminal.

In an exemplary embodiment, when the working state indicates power-on of the terminal or registration of the terminal, controlling power supply to the optical access equipment according to the working state includes that: power supply to the optical access equipment is started; and when the working state indicates dormancy of the terminal or power-off of the terminal, controlling power supply to the optical access equipment according to the working state includes that: power supply to the optical access equipment is terminated.

In an exemplary embodiment, after detecting the working state of the terminal in the home network, the method further includes that: a triggering instruction of a user is received; and power supply to the terminal is controlled according to the working state under triggering by the triggering instruction.

In an exemplary embodiment, processes of controlling power supply to the terminal and controlling power supply to the optical access equipment are mutually independent.

In an exemplary embodiment, mutual independence of the process for controlling power supply to the terminal and the process for controlling power supply to the optical access equipment is implemented in a manner as follows: power supply to the optical access equipment is controlled through a first branch circuit; and power supply to the terminal is controlled through a second branch circuit, herein, the first branch circuit and the second branch circuit are two branch circuits of a voltage division circuit.

In an exemplary embodiment, after controlling power supply to the optical access equipment and/or the terminal, the method further includes that: a Radio Frequency communication signal is separated from a voltage signal for power supply to the optical access equipment and/or the terminal by high-pass filtering, herein, the Radio Frequency communication signal is a data communication signal for the optical access equipment and the terminal.

According to another embodiment of the present disclosure, a power supply device is also provided, which includes: a detection module, arranged to detect a working state of a terminal in a home network, herein, the terminal accesses the home network through a coaxial cable; and a first control module, arranged to control power supply to optical access equipment according to the working state, herein, the optical access equipment is arranged to implement access of a passive optical fiber network to the home network.

In an exemplary embodiment, the detection module is arranged to detect the working state of the terminal in the home network when the working state includes at least one of the following: power-on of the terminal, registration of the terminal, dormancy of the terminal and power-off of the terminal.

In an exemplary embodiment, the first control module includes: a starting unit, arranged to, when the working state indicates power-on of the terminal or registration of the terminal, start power supply to the optical access equipment; and a termination unit, arranged to, when the working state indicates dormancy of the terminal or power-off of the terminal, terminate power supply to the optical access equipment.

In an exemplary embodiment, the device further includes: a receiving module, arranged to receive a triggering instruction of a user; and a second control module, arranged to control power supply to terminal equipment according to the working state under triggering by the triggering instruction.

According to yet another embodiment of the present disclosure, a power supply system is also provided, which includes optical access equipment and a home network terminal and further includes a reverse power supply device, connected between the optical access equipment and the home network terminal and arranged to detect a working state of the home network terminal in a home network and control power supply to the optical access equipment according to the working state, herein, the home network terminal accesses the home network through a coaxial cable, and the optical access equipment is arranged to implement access of a passive optical fiber network to the home network.

According to the embodiment of the present disclosure, the technical solution of controlling power supply to the optical access equipment according to the working state of the terminal in the home network is used, the problem that hybrid fiber coaxial head-end equipment (i.e. the optical access equipment) connected with the terminal in the home network can not get electricity due to a position limit is solved, reverse power supply to the optical access equipment of an in-home section in a hybrid fiber coaxial network is implemented, and a state of reverse power supply to the head-end equipment is regulated in real time according to a working state of home network terminal equipment, so that an on-demand power supply effect is achieved, obvious power-saving and energy-saving effects are achieved, and convenience for deployment of the head-end equipment in the network is also improved.

BRIEF DESCRIPTION OF DRAWINGS

The drawings described here are provided for a further understanding of the present disclosure, and form a part of the present application. Schematic embodiments of the present disclosure and descriptions thereof are used to explain the present disclosure and not intended to form improper limits to the present disclosure. In the drawings.

DETAILED DESCRIPTION OF EMBODIMENTS

The present disclosure will be described below with reference to the drawings and combined with embodiments in detail. It is important to note that the embodiments in the present application and characteristics in the embodiments may be freely combined under the condition of no conflicts.

Other characteristics and advantages of the present disclosure will be elaborated in the following specification, and moreover, partially become obvious from the specification, or are understood by implementing the present disclosure. A purpose and other advantages of the present disclosure may be achieved and obtained through structures specified in the specification, claims and drawings.

Figure 1:
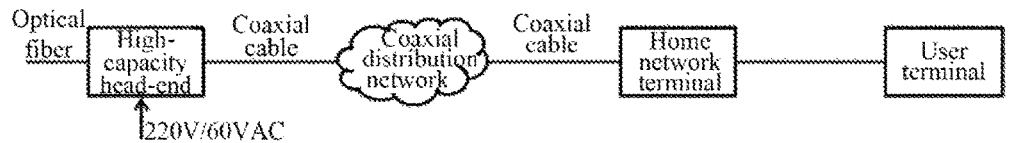
FIG. 1 is an architecture diagram of a hybrid fiber coaxial network according to the existing technology.
Figure 2:
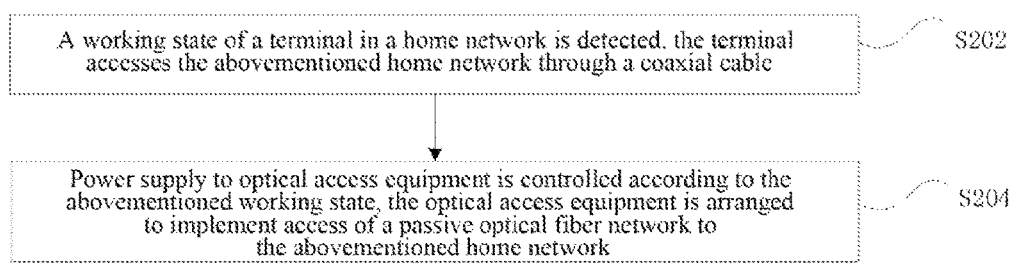
FIG. 2 is a flowchart of a power supply method according to an embodiment of the present disclosure.

The embodiment of the disclosure provides a power supply method. FIG. 2 is a flowchart of a power supply method according to an embodiment of the present disclosure, and as shown in FIG. 2, the method includes Step S202-Step S204.

In Step S202, a working state of a terminal in a home network is detected, herein, the abovementioned terminal accesses the abovementioned home network through a coaxial cable.

In Step S204, power supply to optical access equipment is controlled according to the abovementioned working state, herein, the optical access equipment is arranged to implement access of a passive optical fiber network to the abovementioned home network.

By each of the abovementioned steps, power supply to the optical access equipment is controlled according to the working state of the terminal in the home network, the problem that hybrid fiber coaxial head-end equipment (i.e. the optical access equipment) connected with the terminal in the home network can not get electricity due to a position limit is solved, reverse power supply to the optical access equipment of an in-home section in a hybrid fiber coaxial network is implemented, and a state of reverse power supply to the head-end equipment is regulated in real time according to a working state of home network terminal equipment, so that an on-demand power supply effect is achieved, obvious power-saving and energy-saving effects are achieved, and convenience for deployment of the head-end equipment in the network is also improved.

It is important to note that an execution main body which executes the abovementioned Step S202-Step S204 may be a reverse power supply device, and may also be other equipment capable of realizing the abovementioned function, which is not limited in the present disclosure. In another optional embodiment of the embodiment of the present disclosure, the optical access equipment in Step S204 may implement access of the passive optical fiber network to the abovementioned home network through the coaxial cable.

Optionally, the abovementioned working state includes: power-on of the terminal, registration of the terminal, dormancy of the terminal and power-off of the terminal.

An optional embodiment of the present disclosure is that: when the working state indicates power-on of the abovementioned terminal or registration of the abovementioned terminal, controlling power supply to the optical access equipment according to the abovementioned working state includes that: power supply to the abovementioned optical access equipment is started; and when the working state indicates dormancy of the abovementioned terminal, power-off of the abovementioned terminal, controlling power supply to the optical access equipment according to the abovementioned working state includes that: power supply to the optical access equipment is terminated.

Figure 3:
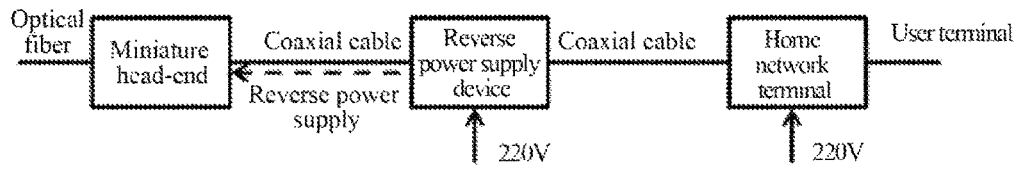
FIG. 3 is an architecture diagram of reverse power supply according to an embodiment of the present disclosure.

In order to better understand the abovementioned power supply flow of only providing reverse power supply, descriptions will be made below with reference to FIG. 3. FIG. 3 is an architecture diagram of reverse power supply according to an embodiment of the present disclosure, and as shown in FIG. 3, by using the power supply method of the present disclosure, independent from the home network terminal equipment, and when the home network terminal may get electricity by itself through a local 200 VAC, the reverse power supply device is only required to perform 48 Volt Direct Current (VDC) or 60 VAC reverse power supply on the head-end equipment on the upstream through the coaxial cable. Under such a condition, the reverse power supply device is completely independent and separate from the home network terminal equipment.

Reverse power supply is implemented in the abovementioned embodiment, forward power supply may also be implemented in the embodiment of the present disclosure, and a specific implementation process may be that: a triggering instruction of a user is received; and power supply to the terminal is controlled according to the working state under triggering by the triggering instruction.

It is important to note that processes of controlling power supply to the terminal and controlling power supply to the optical access equipment are mutually independent. Alternatively, mutual independence is implemented in a manner as follows: power supply to the optical access equipment is controlled through a first branch circuit; and power supply to the terminal is controlled through a second branch circuit, herein, the first branch circuit and the second branch circuit are two branch circuits of a voltage division circuit.

In the embodiment of the present disclosure, after controlling power supply to the optical access equipment and/or the terminal further includes that: an Radio Frequency communication signal is separated from a voltage signal of power supply to the optical access equipment and/or the terminal by high-pass filtering, herein, the Radio Frequency communication signal is a data communication signal for the optical access equipment and the terminal. An execution main body of the step may be the optical access equipment, may also be home network equipment, and may further be the reverse power supply device, which will not be limited in the embodiment of the present disclosure.

Figure 4:
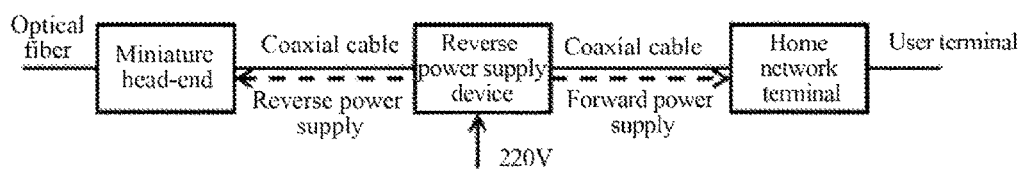
FIG. 4 is an architecture diagram of reverse power supply and forward power supply according to an embodiment of the present disclosure.

In order to better understand the abovementioned flow with forward power supply and reverse power supply existing simultaneously, descriptions will be made with reference to FIG. 4. FIG. 4 is an architecture diagram of reverse power supply and forward power supply according to an embodiment of the present disclosure, and as shown in FIG. 4: by using a reverse power supply method of the embodiment of the present disclosure, reverse and forward power supply functions may also be simultaneously provided, and when the home network terminal may not locally get electricity by itself, the reverse power supply device is not only required to perform 48 VDC or 60 VAC reverse power supply on the head-end equipment on the upstream through the coaxial cable but also required to provide 12 VDC forward power supply for the home network terminal equipment on a downstream through the coaxial cable. Under such a condition, when the home network terminal equipment on the downstream has a 12 VDC electricity getting function through the coaxial cable, the reverse power supply device may provide 12 VDC forward power supply in a key selection manner, and at this moment, the reverse power supply device and the home network terminal equipment are in separation.

Figure 5:
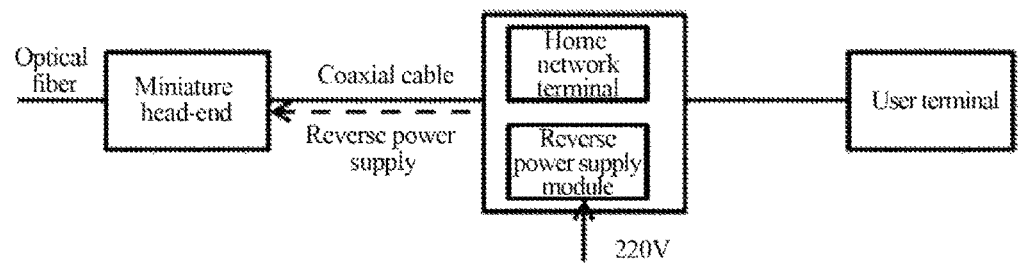
FIG. 5 is an architecture diagram of a home network terminal with built-in reverse power supply according to an embodiment of the present disclosure.

Actually, in a practical application process, the reverse power supply device may also be built in the home network terminal. FIG. 5 is an architecture diagram of a home network terminal with built-in reverse power supply according to an embodiment of the present disclosure. By using the reverse power supply method of the embodiment of the present disclosure, the reverse power supply device may also be integrated into the home network terminal equipment as a module to provide reverse power supply for the head-end equipment on the upstream as integrated equipment. At this moment, the reverse power supply device built in the home network terminal becomes a working sub-module of the network terminal, its monitoring module and power module serve as a part of the home network terminal equipment, may be controlled by an internal control unit of the home network equipment, and may also be systematically integrated and designed in a uniform manner, and after the home network terminal gets electricity through the local 220 VAC, the monitoring module of the reverse power supply module provides 60 VAC or 48 VDC reverse power supply for the head-end equipment on the upstream according to the working state of the home network terminal, and performs reverse power supply state regulation according to the working state of the home network terminal. Under such a condition, the reverse power supply device and the home network terminal equipment are integrally centralized.

Figure 6:
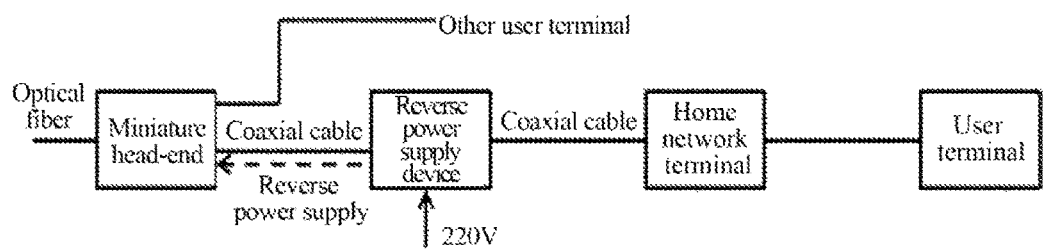
FIG. 6 is an application architecture diagram of a power supply method according to an alternative embodiment of the present disclosure.

FIG. 6 is an application architecture diagram of a power supply method according to an alternative embodiment of the present disclosure. In order to better understand the power supply flow in the abovementioned embodiment, descriptions will be made below combined with an alternative embodiment and FIG. 6, but are not intended to limit the technical solution of the embodiment of the present disclosure. A detailed flow is as follows.

In Step 1, a reverse power supply device implemented by the embodiment of the present disclosure is connected in series with a network connection between a terminal and miniature head-end equipment (equivalent to the optical access equipment of the abovementioned embodiment) under the condition of not changing an existing in-home section network topology, ingress and egress are still coaxial cables, original network interfaces are not changed, and 220V power supply is used for the device itself.

In Step 2, after being powered on, a coaxial cable home network terminal in a home network of a user upwards sends a registration consultation, the reverse power supply device detects information registration from the direction of the home network of the user and a level change on a line, and enables an interface for power supply to the miniature head-end equipment to start power supply to it, a power supply manner protocol uses ordinary 60 VAC power supply or uses POE 48 VDC power supply, and may be configured according to a condition of the head-end equipment.

In Step 3, after all coaxial cable home terminals in the home network of the user are powered off or in a dormancy state, the reverse power supply device detects the dormancy state from the direction of the home network of the user and a level change on the line, and disables the interface for supply power to the miniature head-end equipment to stop power supply to it.

In the present embodiment, the reverse power supply device based on the above reverse power supply method includes a monitoring module and a power module, and the monitoring module is responsible for monitoring a working state such as power-on, information registration and dormancy of the home network terminal, and controlling the power module to provide reverse power supply for the head-end equipment, simultaneously isolating transmission of 60 VAC or 48 VDC reverse power supply to a home network terminal side, and transparently transmitting a Radio Frequency communication signal between the head-end equipment and home network terminal equipment. The power module is responsible for providing 60 VAC or 48 VDC reverse power supply for the head-end equipment according to an instruction of the monitoring module, and providing 12 VDC forward power supply for the home network terminal equipment on a downstream according to a practical requirement. The monitoring module is required to couple a data communication signal (i.e. high-frequency Radio Frequency signal of more than 5 MHz) between the home network terminal equipment and the optical access head-end equipment, while isolate 48 VDC or 60 VAC (50 HZ) reverse power supply and 12 VDC forward power supply.

A further improvement in the abovementioned technical solution in the present embodiment is that 60 VAC and 48 VDC reverse power supply and 12 VDC forward power supply functions of the reverse power supply device may be selected according to a requirement in the key selection manner. When the home network terminal equipment on the downstream has a function of getting electricity of 12 VDC through a coaxial cable, the reverse power supply device may provide 12 VDC forward power supply in the key selection manner.

In the present embodiment, the reverse power supply device upwards reports a power state of the reverse power supply device through a POE protocol, so that a superior network manager may monitor the state of the reverse power supply device. The reverse power supply device is mounted in a place such as an interface of a coaxial cable of the home of the user, a home message box and an underground garage according to a field condition and a degree of convenience for getting electricity.

From the above, in the embodiment of the present disclosure, a key is mounting of the miniature head-end equipment and its reverse power supply device, the reverse power supply device is a device with an input coaxial cable and an output coaxial cable, and an existing network topology and network equipment are not replaced or modified. The reverse power supply device is mounted in the home, or at the message box or the like, where electricity is easy to get, and a local 220 VAC electricity getting manner is used.

The number of users connected to the miniature head-end equipment is usually 1, and the connected user independently provides reverse power supply for the head-end equipment. However, if there are multiple users connected to the head-end equipment, it is necessary to perform current sharing and fair electricity getting for each reverse power supply user in the miniature head-end equipment.

The home network terminal equipment usually includes a Cable Modem (CM), a Cable Node Unit (CNU), a set-top box, or home gateway equipment with a built-in CM/CNU module, or the like.

Figure 7:
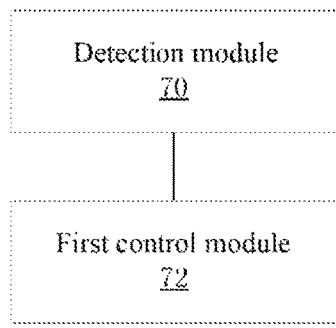
FIG. 7 is a structure block diagram of a power supply device according to an embodiment of the present disclosure.

The embodiment further provides a power supply device, which is configured to implement the abovementioned embodiments and optional implementation modes, and what has been described will not be elaborated. Modules involved in the device will be described below. For example, a term "module", used below, may be a combination of hardware and/or hardware capable of realizing preset functions. Although the device described in the following embodiment is optionally implemented with software, implementation with hardware or a combination of the software and the hardware may be also possible and conceivable. FIG. 7 is a structure block diagram of a power supply device according to an embodiment of the present disclosure. As shown in FIG. 7, the device includes: a detection module 72, arranged to detect a working state of a terminal in a home network, herein, the abovementioned terminal accesses the abovementioned home network through a coaxial cable; and a first control module 74, connected with the detection module 72 and arranged to control power supply to optical access equipment according to the abovementioned working state, herein, the optical access equipment is arranged to implement access of a passive optical fiber network to the abovementioned home network.

By combined effects of various abovementioned modules, the first control module 74 controls power supply to the optical access equipment according to the working state of the terminal detected by the detection module 72 in the home network, the problem that hybrid fiber coaxial head-end equipment (i.e. the optical access equipment) connected with the terminal in the home network can not get electricity due to a position limit is solved, reverse power supply to the optical access equipment of an in-home section in a hybrid fiber coaxial network is implemented, and a state of reverse power supply to the head-end equipment is regulated in real time according to a working state of home network terminal equipment, so that an on-demand power supply effect is achieved, obvious power-saving and energy-saving effects are achieved, and convenience for deployment of the head-end equipment in the network is also improved.

The detection module 72 is arranged to detect the working state of the terminal in the home network when the working state includes: power-on of the terminal, registration of the terminal, dormancy of the terminal and power-off of the terminal.

Figure 8:
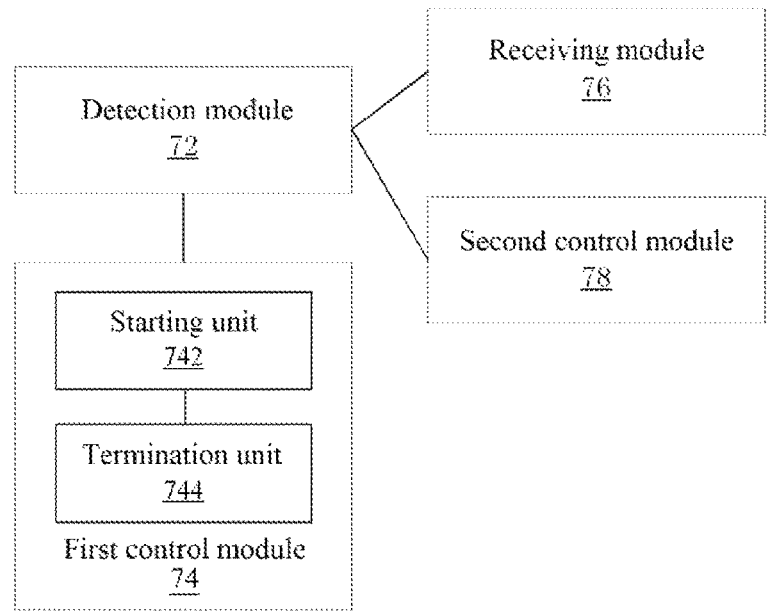
FIG. 8 is another structure block diagram of a power supply device according to an embodiment of the present disclosure.

In the embodiment of the present disclosure, as shown in FIG. 8, the first control module 74 includes: a starting unit 742, arranged to, when the working state indicates power-on of the abovementioned terminal or registration of the abovementioned terminal, start power supply to the abovementioned optical access equipment; and a termination unit 744, connected with the starting unit 742 and arranged to, when the working state indicates dormancy of the abovementioned terminal or power-off of the abovementioned terminal, terminate power supply to the abovementioned optical access equipment.

A further improvement of the embodiment of the present disclosure in the abovementioned technical solution is that, as shown in FIG. 8, the abovementioned device further includes: a receiving module 76, connected with the detection module 72 and arranged to receive a triggering instruction of a user; and a second control module 78, connected with the detection module 72 and arranged to control power supply to the abovementioned terminal equipment according to the abovementioned working state under triggering by the abovementioned triggering instruction.

Figure 9:
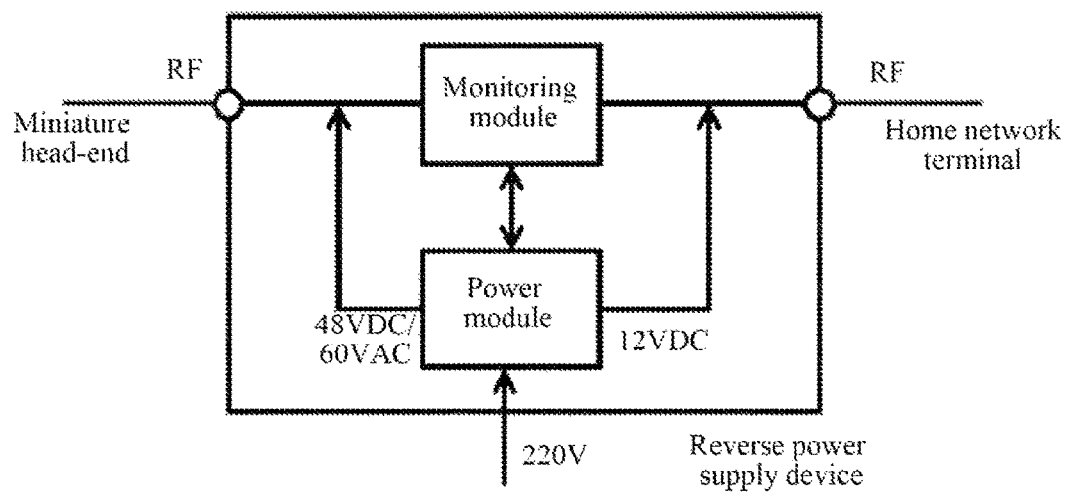
FIG. 9 is an internal architecture diagram of a reverse power supply device according to an embodiment of the present disclosure.

In order to better understand the structure block diagram and working flow of the abovementioned power supply device, descriptions will be made below combined with FIG. 9. FIG. 9 is an internal architecture diagram of a reverse power supply device according to an embodiment of the present disclosure. Hardware modules of the reverse power supply device mainly include: a monitoring module and a power module. The monitoring module is responsible for monitoring the working state such as power-on, information registration and dormancy of the home network terminal, and controlling the power module to provide reverse power supply for head-end equipment, simultaneously isolating transmission of 60 VAC or 48 VDC reverse power supply to a home network terminal side, and transparently transmitting a Radio Frequency communication signal between the head-end equipment and home network terminal equipment, herein, RF in FIG. 9 is an abbreviation of Radio Frequency.

Alternatively, the monitoring module is required to isolate 48 VDC or 60 VAC/50 Hz forward power supply, implemented by a reverse power supply current and voltage provided by the reverse power supply device for the head-end equipment, to the home network terminal side in a high-pass filtering manner to avoid damage to home network side equipment, simultaneously transparently transmits a high-frequency Radio Frequency communication data signal of usually more than 5 MHz between the head-end equipment and the home network terminal equipment, but does not make any change and interference of content and signal level to an information flow on a hybrid fiber coaxial network. In the embodiment of the present disclosure, when the home network side equipment does not expect to get local 220V electricity, a forward power supply switch of the reverse power supply device may be switched on to make the reverse power supply device provide 12 VDC forward power supply for the home network side equipment, the monitoring module of the reverse power supply device judges the working state of the home network terminal by monitoring information about power-on, dormancy, registration, power-off and the like from the home network terminal equipment, and the home network terminal may upwards report its working state information when being in the working state of power-on, dormancy, registration, power-off and the like.

Figure 10:
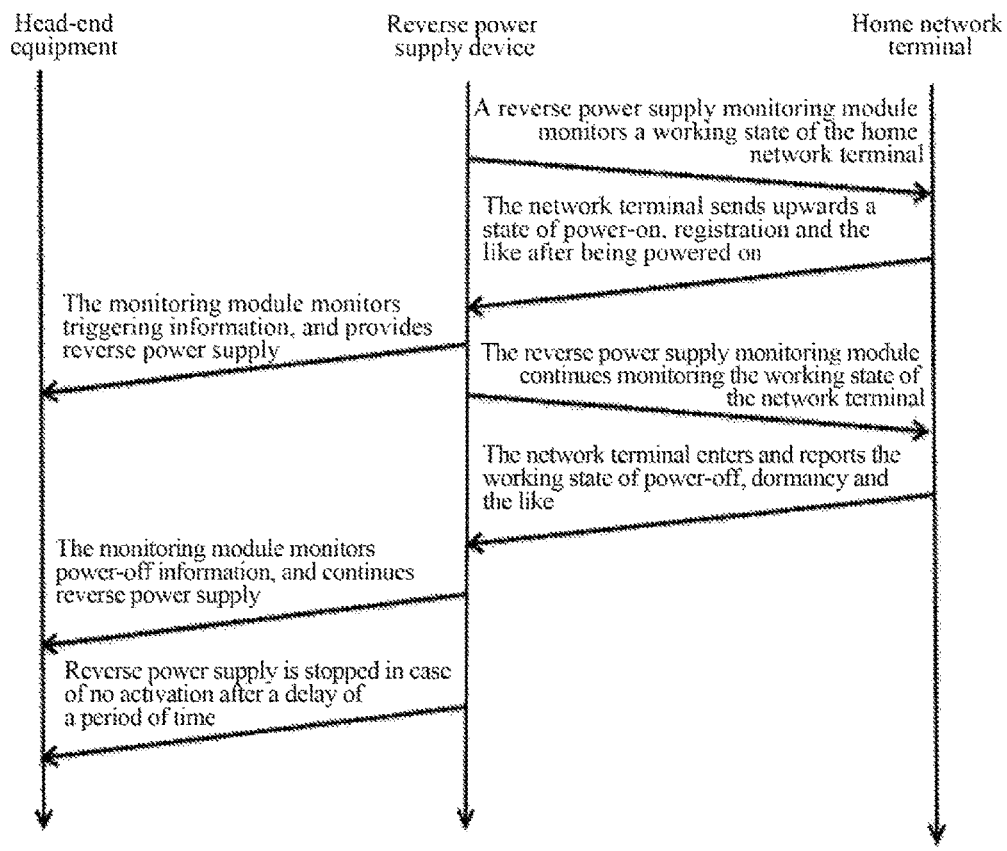
FIG. 10 is a working diagram of a power supply device according to an embodiment of the present disclosure.

In the embodiment of the present disclosure, the following flow may be understood combined with FIG. 10.

1. The reverse power supply device works in a monitoring mode under the condition that no user terminal accesses and is powered on, and the monitoring module continuously monitors a line from the home network of the user.

2. When the home network terminal is powered on and upwards sends a registration request, the monitoring module activates the power module to enter a power supply mode after detecting power-on and the registration request, enables a reverse power supply interface for feeding an uplink cable and the head-end equipment, and reports a working state of the reverse power supply device to a superior network manager.

3. When all home network terminals connected to the reverse power supply device are powered off or in the dormancy state, after the monitoring module detects a power-off or dormancy state signal, the device continues providing reverse power supply for a period of time.

4. If the home network terminal does not reactivate a power supply state in a delayed power supply period of the reverse power supply device, power supply to the miniature head-end equipment is stopped, otherwise reverse power supply is continuously provided for the head-end equipment, thereby ensuring completion of reporting of state information such as power-off alarming of the terminal equipment, and frequent power-on and power-off, caused by frequency power switching-on/off of the terminal, of the head-end equipment and impact on the head-end equipment may be reduced.

Figure 11:
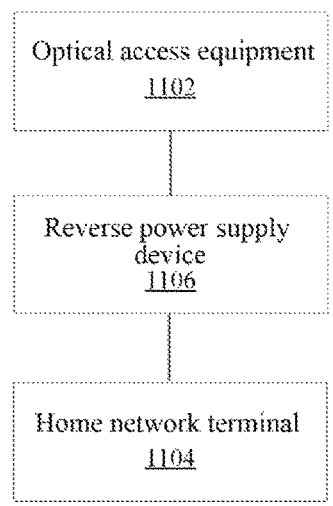
FIG. 11 is a structure block diagram of a power supply system according to an embodiment of the present disclosure.

The embodiment of the present disclosure further provides a power supply system. FIG. 11 is a structure block diagram of a power supply system according to an embodiment of the present disclosure. As shown in FIG. 11, the system includes: optical access equipment 1102, a home network terminal 1104 and a reverse power supply device 1106, herein, the reverse power supply device 1106 is connected between the abovementioned optical access equipment 1102 and the abovementioned home network terminal 1104, and is arranged to detect a working state of the home network terminal in the abovementioned home network, and control power supply to the optical access equipment according to the abovementioned working state, herein, the abovementioned home network terminal accesses the abovementioned home network through a coaxial cable, and the optical access equipment is arranged to implement access of a passive optical fiber network to the abovementioned home network.

The abovementioned reverse power supply device provided by the embodiment of the present disclosure may detect a terminal registration or power-on signal from the coaxial cable of the home network, and enable a power supply interface for head-end equipment to provide reverse power supply for the miniature head-end equipment when there is a signal; and when the user terminal is in a power-off or dormancy state, the reverse power supply device disables the power supply interface for the head-end equipment, to achieve power-saving and energy-saving effects.

Figure 12:
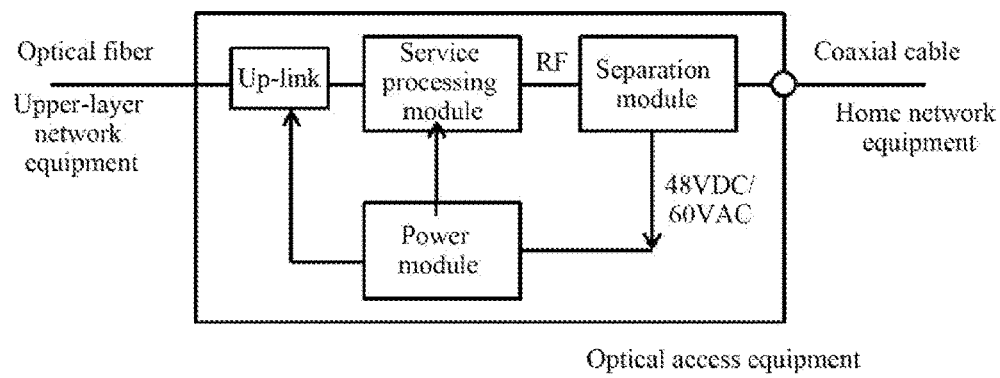
FIG. 12 is an implementation block diagram of optical access equipment reversely supplied with power by a single user according to an embodiment of the present disclosure.
Figure 13:
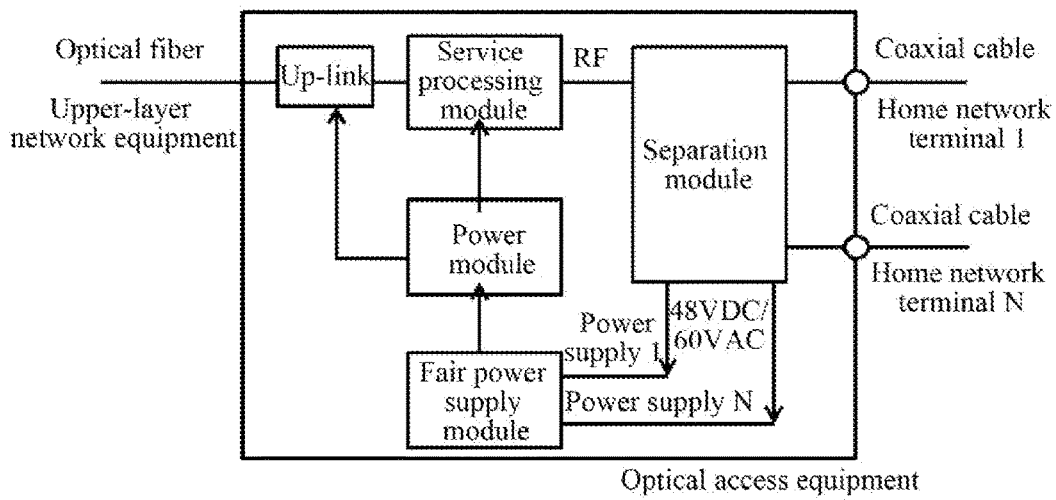
FIG. 13 is an implementation block diagram of optical access equipment reversely supplied with power by multiple users according to an embodiment of the present disclosure.

In order to better understand the abovementioned power supply method, device and system, the embodiment of the present disclosure further provides implementation block diagrams of optical access equipment reversely supplied with power by a single user and reversely supplied with power by multiple users, as shown in FIG. 12 and FIG. 13. FIG. 12 is an implementation block diagram of optical access equipment reversely supplied with power by a single user according to an embodiment of the present disclosure, and FIG. 13 is an implementation block diagram of optical access equipment reversely supplied with power by multiple users according to an embodiment of the present disclosure. Herein, a separation module mainly implements to separate reverse power supply of user network equipment on a home network side from a data communication signal, separate the Radio Frequency data communication signal from reverse power supply (for example, 48 VDC or 60 VAC/50 Hz) in a high/low-pass manner, the Radio Frequency data communication signal is connected with a service processing module, and reverse power supply is connected with a power module. The power module receives user reverse power supply from the separation module, and provides power for an uplink module and the service processing module. The service processing module mainly processes communication data and protocol between upper-layer network equipment (such as an Optical Line Terminal (OLT) and user network terminal equipment (such as a CM and a CNU) as well as control of the whole equipment, and is connected with the upper-layer network equipment (such as the OLT and a switch) through the uplink module. The uplink module mainly processes a physical connection and interface protocol and medium conversion between the optical access equipment and the upper-layer network equipment, is upwards connected with the upper-layer network equipment by optical fiber, and is downwards connected with the service processing module through an internal interface, and the uplink module is usually a processing module such as an Optical Network Unit (ONU), a Gigabit Ethernet (GE) and 10 GE. When the optical access equipment is multiuser access equipment, a fair power supply module is required to be added between the separation module and the power module, and when multiple users provide reverse power supply at the same time, fairness and reasonability of reverse power supply of each user are achieved through the fair power supply module. More specifically, there are many implementation modes for the fair power supply module, and for example, current sharing may be used, statistics about power of power supplied by the users may also be made, and by-the-time alternate power supply may further be used.

From the above, the embodiment of the present disclosure achieves the following beneficial effects: the problem that the hybrid fiber coaxial head-end equipment (i.e. the optical access equipment) connected with the terminal in the home network can not get electricity due to the position limit is solved, reverse power supply to the optical access equipment of the in-home section in the hybrid fiber coaxial network is implemented, and the state of reverse power supply to the head-end equipment is regulated in real time according to the working state of the home network terminal equipment, so that the on-demand power supply effect is achieved, the obvious power-saving and energy-saving effects are achieved, and convenience for deployment of the head-end equipment in the network is also improved.

In another embodiment, software is further provided, and the software is arranged to execute the technical solutions described in the abovementioned embodiments and optional implementation modes.

In another embodiment, a storage medium is further provided, the abovementioned software is stored in the storage medium, and the storage medium includes, but not limited to: a compact disc, a floppy disk, a hard disk, an erasable memory and the like.

Obviously, those skilled in the art should know that each abovementioned module or step of the present disclosure may be implemented by a universal computing device, they may be concentrated on a single computing device or distributed on a network formed by a plurality of computing devices, and alternatively, they may be implemented by program codes executable by the computing devices, so that they may be stored in a storage device for execution by the computing devices, and in some circumstances, the shown or described steps may be executed in sequences different from those described here, or they may be made into various integrated circuit modules respectively, or multiple modules or steps therein may be made into a single integrated circuit module for implementation. As a consequence, the present disclosure is not limited to any specific hardware and software combination.

The above are only optional embodiments of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

According to the abovementioned technical solution of the embodiment of the present disclosure, by using the technical scheme of further controlling power supply to the optical access equipment according to the working state of the terminal in the home network, the problem that hybrid fiber coaxial head-end equipment (i.e. the optical access equipment) connected with the terminal in the home network can not get electricity due to a position limit is solved, reverse power supply to the optical access equipment of an in-home section in a hybrid fiber coaxial network is implemented, and a state of reverse power supply to the head-end equipment is regulated in real time according to a working state of home network terminal equipment, so that an on-demand power supply effect is achieved, obvious power-saving and energy-saving effects are achieved, and convenience for deployment of the head-end equipment in the network is also improved.

I claim:

1. A power supply method, comprising:
detecting, by a supply device, a working state of a terminal in a home network, wherein the terminal accesses the home network through a coaxial cable; and
controlling, by the supply device, power supply to an optical access equipment according to the working state, wherein the optical access equipment is arranged to implement access of a passive optical fiber network to the home network;
wherein after controlling power supply to the optical access equipment, the method further comprises: separating a Radio Frequency communication signal from a voltage signal for power supply to the optical access equipment and/or the terminal by high-pass filtering, wherein the Radio Frequency communication signal is a data communication signal for the optical access equipment and the terminal;
wherein the power supply device is capable of providing forward power supply to the terminal and providing reverse power supply to the optical access equipment;

wherein when the working state indicates power-on of the terminal or registration of the terminal, controlling power supply to the optical access equipment according to the working state comprises: starting reverse power supply to the optical access equipment; and when the working state indicates dormancy of the terminal or power-off of the terminal, controlling power supply to the optical access equipment according to the working state comprises: terminating reverse power supply to the optical access equipment.

2. The method according to claim 1, wherein the working state comprises at least one of the following: power-on of the terminal, registration of the terminal, dormancy of the terminal and power-off of the terminal.

3. The method according to claim 1, wherein after detecting the working state of the terminal in the home network, the method further comprises:

receiving a triggering instruction of a user; and controlling power supply to the terminal according to the working state under triggering by the triggering instruction.

4. The method according to claim 3, wherein, processes of controlling power supply to the terminal and controlling power supply to the optical access equipment are mutually independent.

5. The method according to claim 4, wherein mutual independence of the process for controlling power supply to the terminal and the process for controlling power supply to the optical access equipment is implemented in a following manner:

controlling power supply to the optical access equipment through a first branch circuit; and controlling power supply to the terminal through a second branch circuit, wherein the first branch circuit and the second branch circuit are two branch circuits of a voltage division circuit.

6. A power supply device, comprising:

a computer; and a non-transitory computer readable storage medium storing instructions that, when executed by the computer, cause the computer to perform steps comprising:

detecting a working state of a terminal in a home network, wherein the terminal accesses the home network through a coaxial cable;

controlling power supply to an optical access equipment according to the working state, wherein the optical access equipment is arranged to implement access of a passive optical fiber network to the home network; and separating a Radio Frequency communication signal from a voltage signal for power supply to the optical access equipment and/or the terminal by high-pass filtering, wherein the Radio Frequency communication signal is a data communication signal for the optical access equipment and the terminal;

wherein the power supply device is capable of providing forward power supply to the terminal and providing reverse power supply to the optical access equipment; wherein the steps further comprise:

when the working state indicates power-on of the terminal or registration of the terminal, starting reverse power supply to the optical access equipment; and when the working state indicates dormancy of the terminal or power-off of the terminal, terminating reverse power supply to the optical access equipment.

7. The device according to claim 6, wherein the steps further comprise detecting the working state of the terminal in the home network when the working state comprises at least one of the following: power-on of the terminal, registration of the terminal, dormancy of the terminal and power-off of the terminal.

8. The device according to claim 6, wherein the steps further comprise: receiving a triggering instruction of a user; and controlling power supply to terminal equipment according to the working state under triggering by the triggering instruction.

9. A power supply system, comprising optical access equipment and a home network terminal, and further comprising: a reverse power supply device, connected between the optical access equipment and the home network terminal and arranged to detect a working state of the home network terminal in a home network and control power supply to the optical access equipment according to the working state, wherein the home network terminal accesses the home network through a coaxial cable, and the optical access equipment is arranged to implement access of a passive optical fiber network to the home network;

wherein the reverse power supply device separates a Radio Frequency communication signal from a voltage signal for power supply to the optical access equipment and/or the home network terminal by high-pass filtering, wherein the Radio Frequency communication signal is a data communication signal for the optical access equipment and the home network terminal;

wherein the reverse power supply device is capable of providing forward power supply to the home network terminal and providing reverse power supply to the optical access equipment;

wherein when the working state indicates power-on of the home network terminal or registration of the home network terminal, the reverse power supply device starts reverse power supply to the optical access equipment; and when the working state indicates dormancy of the home network terminal or power-off of the home network terminal, the reverse power supply device terminates reverse power supply to the optical access equipment.

* * * * *